(12) United States Patent
Primot et al.

(10) Patent No.: US 6,577,403 B1
(45) Date of Patent: Jun. 10, 2003

(54) ACHROMATIC OPTICAL INTERFEROMETER WITH CONTINUOUSLY ADJUSTABLE SENSITIVITY

(75) Inventors: Jérôme Primot, Chatillon (FR); Nicolas Guerineau, Antony (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 223 days.

(21) Appl. No.: 09/592,963

(22) Filed: Jun. 13, 2000

(30) Foreign Application Priority Data

Jun. 17, 1999 (FR) .............................. 99 07804

(51) Int. Cl.$^7$ ............................................... G01B 9/02
(52) U.S. Cl. ...................................... 356/521
(58) Field of Search ............................ 356/521, 520, 356/512, 513, 489, 495

(56) References Cited

U.S. PATENT DOCUMENTS 3,829,219 A * 8/1974 Wyant ....................... 356/521

FOREIGN PATENT DOCUMENTS

| FR | 2682761 | 4/1993 |
|----|---------|--------|
| FR | 2712978 | 6/1995 |

OTHER PUBLICATIONS

"Phase Measurement Systems for Adaptive Optics," by James C. Wyant, et al., Optical Science Center, University of Arizona, pp 48–1 to 48–12.

"Variations on a Hartmann Theme," by Francis Roddier, Review SPIE, Tucson, 1990, pp 1–5.

"Achromatic Three–Wave (or More) Lateral Shearing Interferometer," by J. Primot, et al., vol. 12, No. 12, Journal of Optical Society of America, Dec. 1999, pp 2679–2684.

* cited by examiner

Primary Examiner—Samuel A. Turner
(74) Attorney, Agent, or Firm—Lawrence E. Laubscher, Sr.

(57) ABSTRACT

In a process for analyzing the wavefront of a light beam, a diffraction grating with rectangular meshing is placed in a plane perpendicular to the light beam to be analyzed and optically conjugate with the analysis plane. Different emergent beams from the grating interfere to form an image whose deformations are related to the slopes of the wavefront analyzed. The grating multiplies an intensity function, implemented by a two-dimensional intensity grating, which defines a rectangular meshing of sub-pupils transmitting the light from the beam to be analyzed into a plurality of emergent beams disposed in accordance with a rectangular meshing, with a phase function implemented by a two-dimension phase grating which introduces a phase shift between two adjacent emergent beams such that the two emergent beams are in phase opposition.

5 Claims, 3 Drawing Sheets

ACHROMATIC OPTICAL INTERFEROMETER WITH CONTINUOUSLY ADJUSTABLE SENSITIVITY

BACKGROUND OF THE INVENTION

1—Field of the Invention

The invention relates to the analysis of the wavefront of a light beam.

2—Description of the Prior Art

This type of analysis is used to test optical components, to qualify optical devices and to control deformable optical components used in active or adaptive optics. It is also used to study physical phenomena which cannot be measured directly, such as variations of the optical index within turbulent media encountered on passing through the terrestrial atmosphere or in a wind tunnel. It is also used to test the flatness of electronic components, for example matrix focal planes, and for shaping power laser beams.

The type of wavefront analysis to which the invention relates is based on the use of a diffraction grating positioned on the path of the beam to be analyzed.

To make the following description easier to understand, a grating of the above kind is defined as an optical system introducing periodic variations of phase, intensity, or phase and intensity. Any grating is therefore characterized by the multiplication of two functions: the one, called as a phase function, representing periodic variations of phase introduced by the grating and the other one, called as an intensity function, representing periodic variations of intensity introduced by the grating.

French patent application No. 2,712,978 outlines the mode of construction and definition of a two-dimensional grating. A set of points disposed regularly in two directions constitutes a plane meshing. The points define an elementary mesh. The elementary mesh is the smallest surface for paving the plane without gaps in the two directions defining it. The polygon of the elementary mesh is the minimum surface polygon whose sides are supported by the mediatrices of the segments connecting any point of the set to its nearest neighbors. A two-dimensional grating is the intentional repetition of an elementary pattern disposed in accordance with a plain meshing. A plain meshing can define hexagonal or rectangular elementary meshes (square meshes are merely a special case of rectangular meshes).

When a diffraction grating is illuminated with a light beam, called as an incident beam, the light beams diffracted by the grating, called as emergent beams, can be described using two equivalent approaches.

The first approach considers the emergent beams as replicas of the incident beam. They are referred to as sub-beams, each corresponding to one order of diffraction of the grating.

The second approach considers the emergent beams as beams diffracted by each mesh of the grating. They are referred to as secondary beams.

When an intensity function is introduced by a grating, each secondary beam originates from a sub-pupil.

The Hartmann-Shack analyzer is known by the article "PHASE MEASUREMENTS SYSTEMS FOR ADAPTIVE OPTICS", J. C. WYANT, AGARD Conf. Proc., N°300, 1981. The general principle of its operation is optical conjugation of the phase error to be analyzed with an analysis plane containing an array of microlenses which defines a two-dimensional grating made up of a phase function, each microlens delimiting a secondary beam. In the common plane of the foci of the microlenses, referred to as the observation plane, two-dimensional meshing of spots deformed according to the slopes of the wavefront is observed. For active or adaptive optical control applications, the preferred meshing is rectangular. The foregoing description is based on a conventional description of the Hartmann-Shack analyzer and on the approach of decomposition into secondary beams. Another interpretation based on decomposition into sub-beams diffracted by the array of microlenses is outlined in the publication "Variations on a Hartmann theme", F. Roddier, SPIE, TUXON 1990.

That type of analyzer has the advantage of working in polychromatic light, provided that the path difference error to be detected does not depend on the wavelength. It is very simple to use, consisting of a single optical component, and its optical efficiency is very high. However, its sensitivity and dynamic range can be adjusted only by changing the array of microlenses. In an analysis mode referred to as the undersampled mode it can also be used to analyze the wavefront obtained from low-intensity light sources. This analysis mode uses a small number of microlenses, regardless of the wavefront to be measured, in order to concentrate the low usable flux at a few points where the slope of the wavefront is measured.

French patent application No. 2,712,978, already mentioned, describes a three-wave lateral shear interferometer using a two-dimensional phase and/or intensity grating and a spatial filtering system. Using the approach of decomposition into sub-beams, the grating optically subdivides the incident beam to be analyzed into three sub-beams in a conjugate plane of the error. Particular optical processing of the three sub-beams obtained in this way produces an interferogram consisting of a hexagonal meshing of light spots whose contrast does not vary, regardless of the observation plane used. The interferogram is sensitive to the slopes of the wavefront, and offers the possibility of continuous adjustment of the dynamic range and sensitivity. The observation distance is defined as the distance between the observation plane and the zero sensitivity plane, which is a plane conjugate with the plane of the grating downstream of the spatial filter. In the article "Achromatic three-wave (or more) lateral shearing interferometer", Journal of Optical Society of America A, volume 12, N°12, December 1995, pages 2679–2685, there is an outline description of a modification of the above interferometer toward a four-wave lateral shear interferometer in which the two-dimensional meshing of the light spots observed in the interferogram is rectangular and therefore better suited to active or adaptive optical control applications.

This type of analyzer is achromatic and its luminous efficiency is close to that of the Hartmann-Shack analyzer. On the other hand, it is more complex to use because of the insertion of the spatial filtering system for selecting the sub-beams between the grating and the observation plane of the interference fringe system. Also, the spatial filtering system imposes limitations on measuring light beams with a high level of interference or a very large bandwidth. It therefore cannot use the undersampled analysis mode referred to in connection with the Hartmann-Shack analyzer.

It would therefore appear to be strongly desirable to have an interferometer combining the simplicity of use and operating capacity of the Hartmann-Shack analyzer, from low-intensity light sources with high levels of interference or very large bandwidth, and the flexible adjustment of the dynamic range of the three-wave lateral shear interferometer described in French patent application No. 2,712,978 or the four-wave lateral shear interferometer outlined in the article "Achromatic three-wave (or more) lateral shearing interferometer".

OBJECT OF THE INVENTION

The object of the present invention is to make progress in this direction.

SUMMARY OF THE INVENTION

The invention can be considered in the form of a method or a system.

The method of analyzing the wavefront of a light beam according to the invention is of the type wherein a two-dimensional diffraction grating with rectangular meshing is placed in a plane which is perpendicular to the light beam to be analyzed and which is optically conjugated with a plane of analysis of the wavefront, thereby multiplying an intensity function by a phase function and causing through these functions the beam to be diffracted into different beams emergent from the grating. The intensity function defines a rectangular meshing of sub-pupils in the two-dimensional meshing transmitting the light from the light beam to be analyzed to form a plurality of secondary beams disposed in accordance with the rectangular meshing. The phase function introduces a phase shift between two adjacent secondary beams such that the two adjacent secondary beams are in phase opposition. An image formed by interference between the emergent secondary beams is created and observed in a plane located at a predetermined distance from the perpendicular plane. Deformations in the image is related to the slopes of the analyzed wavefront.

The expression "phase opposition" must be understood as also meaning phase shifts substantially adjoining absolute phase opposition.

Thanks to the above, the diffraction grating multiplying the two functions defined in this way diffracts a rectangular meshing of secondary beams which propagate and interfere with each other to generate an image in any observation plane parallel to the plane of the grating, the image taking the form of a rectangular meshing of light spots whose contrast is substantially independent of the wavelength and of the observation distance.

The rectangular meshing of the light spots can be observed in the plane of the grating (zero sensitivity plane). The meshing is advantageously observed in a plane at an observation distance chosen by the user according to the slopes of the wavefront to be analyzed and the required dynamic range.

This method works in polychromatic light and can be used to measure beams with a high level of interference, offering continuous adjustment of the sensitivity and the dynamic range of the system by adjusting the observation distance.

The user therefore has the benefit of the flexibility of continuous adjustment of the dynamic range of the four-wave lateral shear interferometer without the user constraints associated with the insertion of the spatial filtering system.

The invention also encompasses systems for implementing the light beam wavefront analyzing method. Such a system comprises input optics optically conjugating a reference plane with a plane in which the wavefront is analyzed and a two-dimensional diffraction grating with rectangular meshing in the reference plane. The grating causes diffraction of the beam into different emergent beams, and comprises an intensity beam and a phase grating. The intensity grating has an elementary intensity mesh in which an elementary intensity pattern is disposed and which is of length L in a first direction of the rectangular meshing and of width l in a second direction of the rectangular meshing. The phase grating has an elementary phase mesh in which an elementary phase pattern is disposed and which is of length 2L in the first direction of the rectangular meshing of the phase grating and of width 2l in the second direction of the rectangular meshing of the phase grating. The sides of the elementary meshes of the phase grating coincide with sides of the elementary meshes of the intensity grating. The elementary phase pattern introduces a phase shift close to $\pi$ (modulo $2\pi$) between two secondary beams passing through two adjacent elementary intensity patterns. The system also comprises means for observing an image formed by interference between the emergent secondary beams, deformations in the image being related to the slopes of the analyzed wavefront.

A preferred intensity two-dimensional grating according to the invention has a rectangular intensity elementary pattern whose area is close to 50% of the area of the intensity elementary mesh.

A preferred two-dimensional phase grating according to the invention, made from a material having a particular thickness and a transmission index, has a four-square checkerboard phase elementary pattern, each square of the checkerboard having the length L and the width l of the intensity elementary mesh, two adjacent squares having different thicknesses performed the defined phase function by varying the index.

BRIEF DESCRIPTION OF THE DRAWINGS

Further features and advantages of the invention will be apparent from the following particular description of several preferred embodiments of the invention shown in the corresponding accompanying drawings, in which.

DESCRIPTION OF THE PREFERRED EMBODIMENTS

Figure 1A:
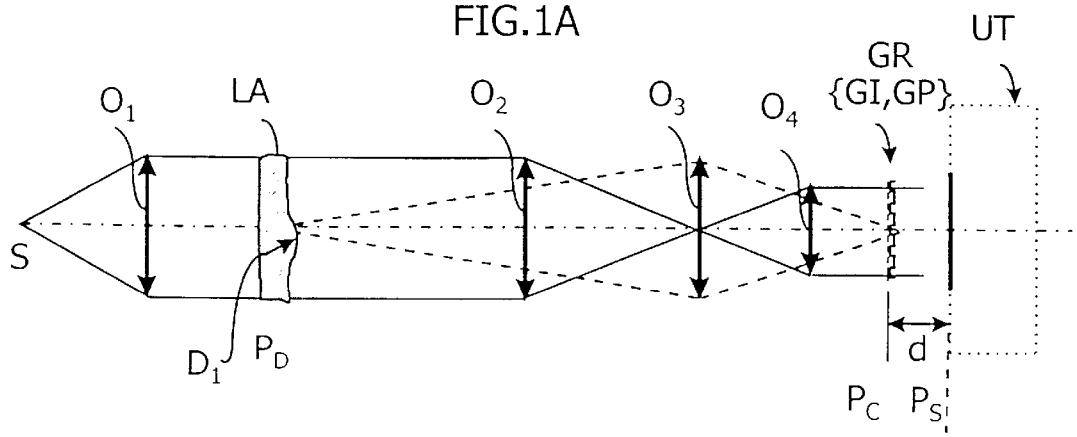
FIG. 1A is a theoretical optical diagram of a system for implementing the invention for testing optical components.
Figure 1B:
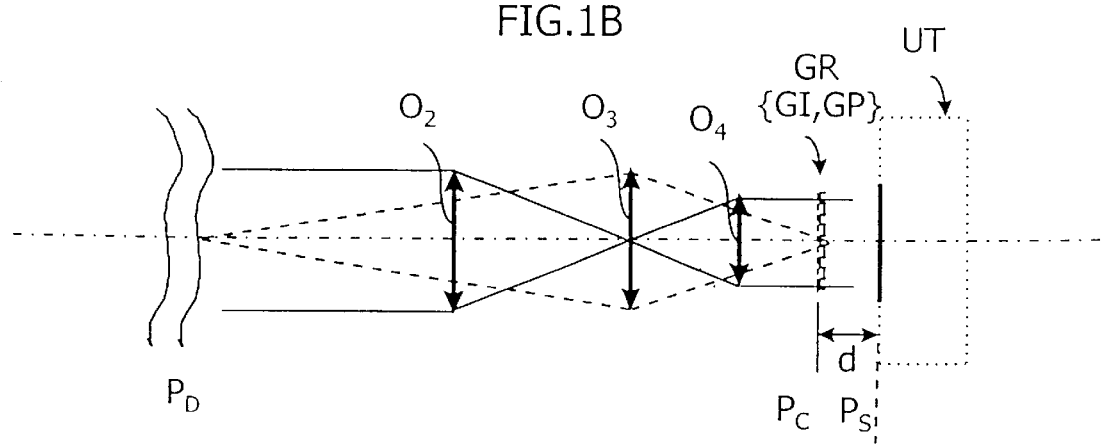
FIG. 1B is a theoretical optical diagram of a system for measuring turbulent media, such as the terrestrial atmosphere, through which passes a beam from a polychromatic source such as a star.

FIGS. 1A and 1B show two examples of systems for implementing the invention.

In FIG. 1A, a polychromatic light source S is placed at the focus of a collimating lens $O_1$. The parallel light beam leaving the lens $O_1$ illuminates a sample to be tested, which is shown diagrammatically as a plate LA with parallel faces, placed in the plane $P_D$ and having a flatness error $D_1$. The sample can be any other optical system (a lens or a mirror, in particular a telescope mirror), or simply a region of a gaseous medium disturbed by a flow, for example.

FIG. 1B illustrates a system for implementing the invention in the case of an application to astronomy. A plane wave from a very distant source such as a star, for example, passes through a turbulent medium whose index variations are represented by sinuous lines.

An input arrangement provides the optical adaptation necessary for implementing the process according to the invention.

This adaptation is preferably performed by an afocal system consisting of two lenses $O_2$ and $O_4$ with a field lens $O_3$ at an intermediate position. The functions of the afocal system are to match the diameter of the beam analyzed in the plane $P_D$ to the dimensions of the two-dimensional grating in a plane $P_C$ and to conjugate the plane $P_D$ containing the error to be analyzed optically with the plane $P_C$.

Other means can be used to achieve this optical conjugation of the two planes.

Figure 5:
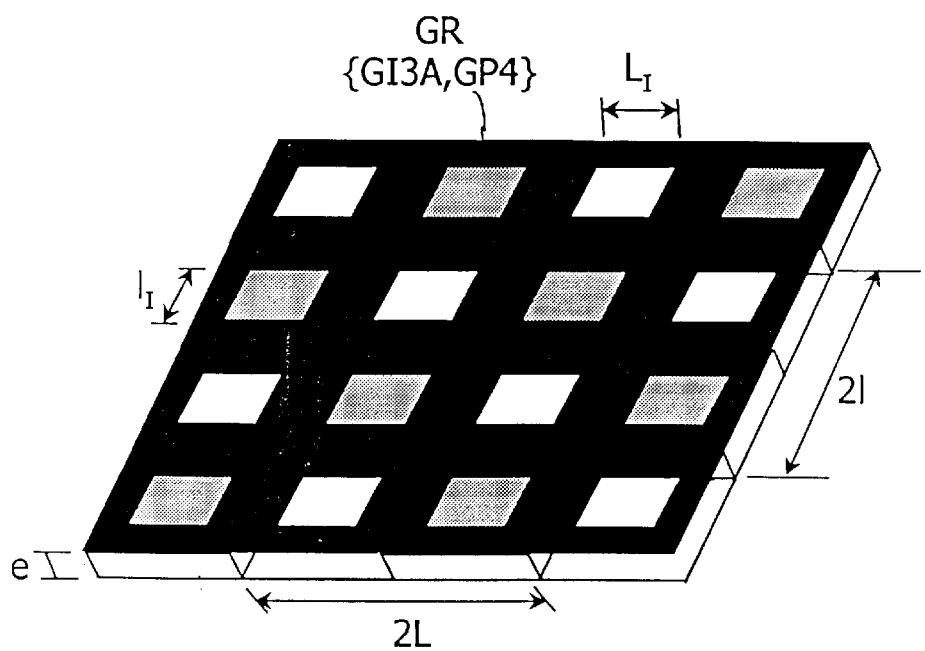
FIG. 5 shows one example of a rectangular meshing grating according to the invention.

A two-dimensional grating GR able to combine intensity and phase functions is placed in the analysis plane $P_C$. This grating can consist of two gratings GI3A, GP4 or more, like that shown in FIG. 5, for example. It is the particular combination of functions that characterizes the grating of the invention, rather than a particular embodiment.

In the example of embodiment shown, the grating GR is made up of an intensity grating GI and a phase grating GP.

The intensity grating GI implements an intensity function FI which defines a rectangular meshing of sub-pupils transmitting the light of the beam to be analyzed in the form of a plurality of secondary beams.

The phase grating GP implements a phase function FP which introduces a mean phase shift between two adjacent secondary beams close to $\pi$ (modulo $2\pi$).

The order in which the two functions are effected in the plane is of no importance.

According to the invention, the interferogram is made up of a rectangular meshing of spots.

The plane $P_C$ is a zero sensitivity plane.

The observation is effected in a plane $P_S$ located at a chosen observation distance d from the plane $P_C$.

The dynamic range and sensitivity of the system vary with the observation distance. Thus if d is zero, the observation plane is coincident with the analysis plane $P_C$ in which the grating is located and the sensitivity is zero.

In general, it is possible to use additional means of observing the plane $P_S$, for example a lens which optically conjugates the plane $P_S$ and a more accessible working plane.

Figure 2:
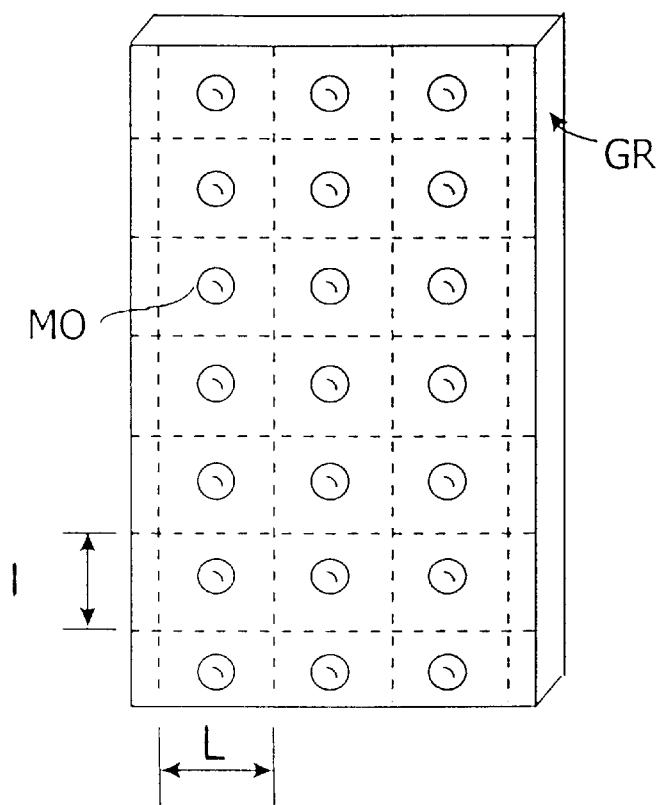
FIG. 2 shows a rectangular meshing two-dimensional grating.

FIG. 2 shows a rectangular meshing two-dimensional grating GR characterized by a rectangular elementary mesh of length L and width l. The meshing, represented in chain-dotted line, is not necessarily visible in the final grating. In each mesh, a pattern MO is shown which introduces variations of the intensity and/or phase of the incident light beam.

Figure 3A:
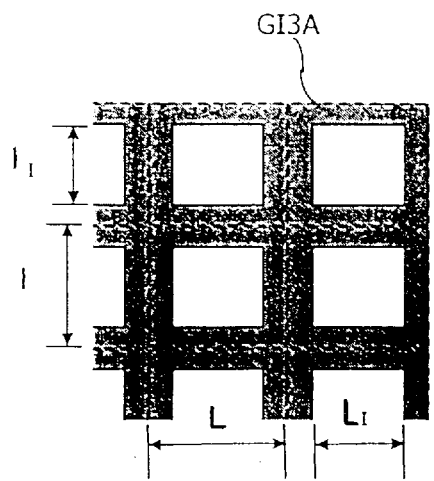
FIG. 3A shows one example of a rectangular meshing intensity grating that can be used in the invention.
Figure 3B:
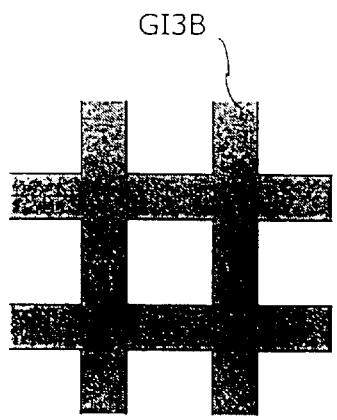
FIG. 3B shows one example of a square meshing intensity grating that can be used in the invention.

FIGS. 3A and 3B show two-dimensional intensity gratings GI which offer a simple means of implementing the intensity function of the method according to the invention. FIG. 3A shows a crossed Ronchi grating GI3A with a rectangular meshing of length L and width l. The shaded areas are areas of zero transmission and the clear areas can be either transparent or reflecting. These clear areas constitute sub-pupils. The dimensions $L_I$ and $l_I$ of these transparent areas are preferably close to 2L/3 and 2l/3, respectively. The area of each sub-pupil is therefore close to half the area of the elementary mesh of the rectangular meshing. FIG. 3B shows a crossed Ronchi grating GI3B with a square mesh of side length L, which is deemed to constitute the most advantageous embodiment of the invention.

Figure 4:
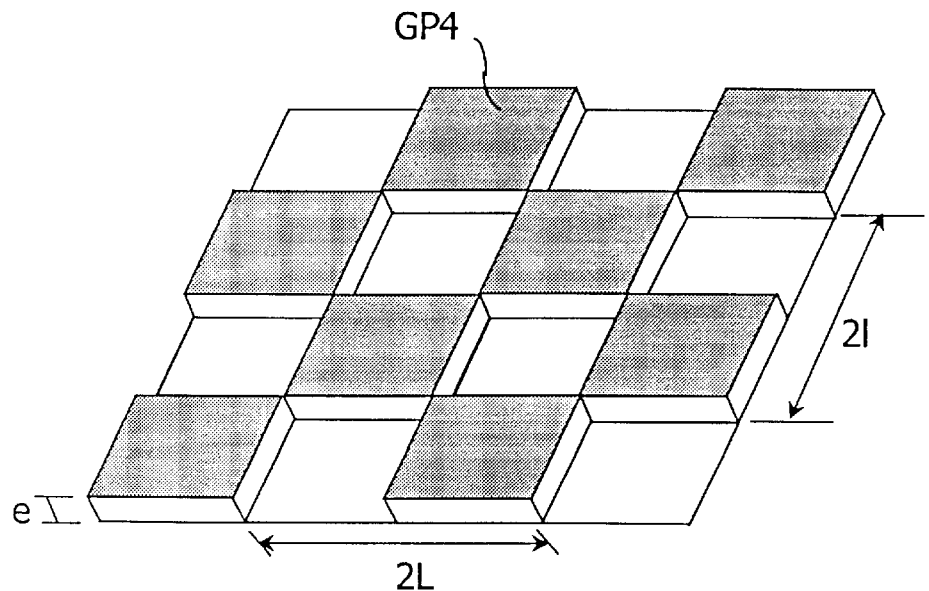
FIG. 4 shows one example of a rectangular meshing phase grating that can be used in the invention.

FIG. 4 is a perspective view of one example of a two-dimensional phase grating GP which offers a simple means of implementing the phase function of the method according to the invention. FIG. 4 shows a rectangular meshing checkerboard grating GP4 with side length 2L and 2l, e.g. with two levels of thickness. The grating GP4 has stepped periodic thickness variations so that the thickness difference e between adjacent steps or levels satisfies the equation:

$$e=\lambda/n.(k+\tfrac{1}{2}),$$

where
- $\lambda$ is the mean operating wavelength,
- n is
    - either the refractive index of the material when the phase grating is used in transmission mode, or
    - twice the refractive index of the transmission medium when the phase grating is used in reflection mode,
- and k is an integer.

The shaded areas of the grating GP4 can be transparent for a grating used in transmission mode or reflecting for a grating used in reflection mode.

An advantageous means of implementing the gratings GI and GP is to use the masking and photolithographic etching techniques widely used in the semiconductor industry; thus GI can be implemented by depositing a metal mask onto a substrate wafer and GP by etching a substrate wafer. With these techniques it is possible to make a two-dimensional phase and intensity grating which combines the FI and FP functions of gratings GI and GP, respectively, from a single substrate plate.

Other methods of implementing the two functions FI and FP with gratings GI and GP can be envisaged, for example based on registering interferograms on photosensitive plates to produce holographic gratings.

Combining the GI and GP gratings generates a meshing of light spots whose contrast is substantially independent of the observation distance d and the wavelength used. Because of the sudden intensity variations caused by the Ronchi intensity grating GI, contrast fluctuations occur during propagation which cause high-frequency local deformation of the light spots. These unwanted deformations remain small compared to the sinusoidal intensity modulation observed in the two directions and do not interfere with the analysis of the wavefront.

French patent application No. 2,682,761 proposes a technique for analyzing the interference images obtained in order to obtain the slopes of the wavefront. Those techniques can be applied directly to the meshings of lights spots obtained in accordance with the present invention.

The grid of the deformations of the meshing of light spots can also be obtained by calculating the position of the barycenters of the light spots. This technique is routinely employed in the case of a Hartmann-Shack analyzer and can be applied directly to the rectangular meshings of light spots obtained in accordance with the present invention.

What we claim is:

1. A system for analyzing the wavefront of a light beam, comprising:
   (a) input optics optically conjugating a reference plane with a plane in which said wavefront is analyzed, (b) a two-dimensional intensity grating with rectangular meshing in the reference plane, said intensity grating having an elementary intensity mesh in which an elementary intensity pattern is disposed and which is of length L in a first direction of said rectangular meshing and of width l in a second direction of said rectangular meshing, (c) a two-dimensional phase grating with rectangular meshing in the reference plane, said phase grating having an elementary phase mesh in which an elementary phase pattern is disposed and which is of length 2L in the first direction of said rectangular meshing of said phase grating and of width 2l in the second direction of said rectangular meshing of said phase grating, (d) said elementary phase meshes having sides coinciding with sides of said elementary intensity meshes, and said elementary phase pattern introducing a phase shift close to $\pi$ (modulo $2\pi$) between two secondary beams passing through two adjacent elementary intensity patterns, and (e) means for observing an image formed by interference between said secondary beams in a plane located at a predetermined distance from said reference plane, deformations in said image being related to the slope of the analyzed wavefront.

2. The system claimed in claim 1 wherein said intensity grating is of the rectangular crossed Ronchi type.

3. The system claimed in claim 1 wherein said phase grating is of the checkerboard type with two levels of thickness.

4. The system claimed in claim 1 wherein said intensity and phase gratings operate in transmission mode.

5. The system claimed in claim 1 wherein said intensity and phase gratings operate in reflection mode.

* * * * *